United States Patent [19]

Kuoni

[11] Patent Number: 4,708,447

[45] Date of Patent: Nov. 24, 1987

[54] APPARATUS FOR THE ENDLESS PROJECTION OF A CINEMATOGRAPHIC FILM

[75] Inventor: Xaver Kuoni, Lieli, Switzerland

[73] Assignee: C.E.T. Construction Eng'g. & Technology Ltd., London, England

[21] Appl. No.: 804,644

[22] PCT Filed: Mar. 19, 1985

[86] PCT No.: PCT/CH85/00046

§ 371 Date: Dec. 18, 1985

§ 102(e) Date: Dec. 18, 1985

[87] PCT Pub. No.: WO85/04263

PCT Pub. Date: Sep. 26, 1985

[30] Foreign Application Priority Data

Mar. 19, 1984 [CH] Switzerland ............... 1375/84

[51] Int. Cl.$^4$ ............................................. G03B 21/00
[52] U.S. Cl. ................................. 352/128; 242/55.19 R
[58] Field of Search ............... 242/55.19 R, 55.19 A; 352/128

[56] References Cited

U.S. PATENT DOCUMENTS 1,279,762  9/1918  Rossman et al. ............ 242/55.19 R
1,631,137  6/1927  Kincade .
1,639,469  8/1927  Scofield et al. ............. 242/55.19 R
2,273,274  2/1942  Krouse ....................... 242/55.19 A
2,740,628  4/1956  Small .

FOREIGN PATENT DOCUMENTS

1197500  6/1959  France ........................ 242/55.19 R
534171  10/1955  Italy ............................ 242/55.19 R
43-13509  6/1968  Japan .......................... 242/55.19 R
1134814  11/1968  United Kingdom .

Primary Examiner—Monroe H. Hayes
Attorney, Agent, or Firm—Watson, Cole, Grindle & Watson

[57] ABSTRACT

An apparatus for the endless projection of a cinematographic film comprises a horizontal, rotatable table (24) and a winding drum (34) positioned in the center of the table. The film (22) to be projected is formed to a film roll (25) surrounding the winding drum (34). An annular body (61) of the winding drum (34) is provided at its outer periphery with a great number of rotatable support rollers (64) having vertical axles (65), for radially supporting the innermost winding of the film roll (25). On the upper side of the table (24) a plurality of horizontal support rollers (40, 41) are arranged, the axles of which are radial to the table (24). The axial length of each horizontal support roller (40, 41) is substantially shorter than the radial dimension of the table (24). The annular body (61) of the winding drum (34) is provided with a radial slit (120), through which the innermost winding of the film roll (25) can be drawn off. In the inner space of the winding drum (34) there are a plurality of guide pulleys (122-126, 140) and a motor driven sprocket (131) for guiding and moving the film, so that the film is continuously drawn off from the inner periphery of the film roll (25) and fed to a projector. The film portion coming back from the projector is continuously wound up at the outer periphery of the film roll (25). The table (24) is rotated by means of a motor to favor the rotation of the film roll during the projection.

9 Claims, 10 Drawing Figures

APPARATUS FOR THE ENDLESS PROJECTION OF A CINEMATOGRAPHIC FILM

BACKGROUND OF THE INVENTION

1. Field of the Invention

The present invention relates to an apparatus for the endless projection of a cinematographic film, comprising a rotatably journalled table for axially supporting a spiral-like film roll, a winding drum coaxially arranged on the table and having an annular support body for radially supporting the innermost winding of the film roll, first guide rollers for continuously delivering the film from the innermost winding of the film roll for the purpose of feeding the film to a film projector, and further guide rollers for guiding the film coming back from the film projector to the outermost winding of the film roll.

2. The Prior Art

Usually, a cinematographic film has a forward or leading end and a rear or trailing end. Generally, such a film is handled in form of a spiral-like film roll placed on a winding core or winding drum, one end of the film strip being releaseably fixed at the winding core or winding drum. In accordance with a widely practised method, the film strip is drawn off from the outer periphery of the film roll as it is projected, then passed through the projector, and thereafter re-wound on a second winding core or winding drum. By doing so, the leading end of the film strip comes to lie at the inner periphery of the second film roll being formed. To allow another projection of the film, it is necessary to rewind the film strip before it can be projected again.

In order to avoid the necessity of rewinding the film, apparatus have been constructed which allow the film to be continuously unwound from the inner periphery of a film roll as the film is projected, and to continuously rewind the film leaving the projector so that a second film roll is built up in which the leading end of the film again is the innermost end. The so formed second film roll is then immediately ready for a further projection of the film, whereby again the film is unwound from the inner periphery of the film roll. With this known apparatus the necessity for rewinding the film after each projection is eliminated. However it is still necessary to load the leading end portion of the film into the projector and to fix it at another winding drum for each further projection. Thus, an endless projection is not possible.

On the other hand, it is also known to connect the trailing end of a film with the leading end thereof so as to form an endless loop which can continuously be projected. In practice, however, serious problems do arise where the film is of considerable length. In a known apparatus for the endless projection of a film, a major portion of the film is guided in the form of a meander strip around a great number of guide rollers. Particularly for substandard films, apparatus have also become known in which the endless film is continuously rewound from the inner periphery of a spiral-like film roll and, after having passed through the projector, is continously wound up on the outer periphery of the same film roll. It is clear that with this method the consecutive or neighboured windings of the film roll travel with different angular speed, which consequently causes some friction between the neighboured windings when the inner and the outer diameters of the film roll are maintained at constant values. The technical problems thus caused increase with increasing gauge, length and weight of the film. The mentioned problems essentially occur in view of preserving a good condition of the film, i.e. in avoiding scratches and scrapes in the emulsion of the film due to friction of the windings of the film roll and in avoiding damage to the film perforations due to excessive high tension forces necessary for the continous feed or travel of the film.

In view of the before-mentioned technical problems, it is not surprising that satisfactory apparatus for the endless projection of longer cinematographic films of the standard 35 mm gauge, or larger, have not been available until now. It should be remembered that a commercial 35 mm motion-picture film of 90 minutes projection time has a length of 2,500 m and a weight of about 17 kg.

It is the main object of the present invention to provide an improved apparatus for the endless projection of cinematographic films which ensures an unattained careful handling of the film so that 35 mm and even larger motion-picture films having a projection time of more than 1 hour may be continuously projected.

SUMMARY OF THE INVENTION

According to the invention, the apparatus comprises a rotatably journalled table for axially supporting a spiral-like film roll, a winding drum coaxially arranged on the table and having an annular support body for radially supporting an innermost winding of the film roll and for defining an interior space in the winding drum, first guide pulleys for continuously delivering the film from the innermost winding of the film roll for the purpose of feeding the film to a film projector, some of the first guide pulleys being located in the interior space of the winding drum, further guide pulleys for guiding the film coming back from the projector to an outermost winding of the film roll, a sprocket for the film transport located within the interior space of the winding drum; wherein the annular support body of the winding drum has an outer circumference mounting a plurality of pairs of support rollers which are freely rotatable on axles extending in parallel with an axis of the winding drum for frictionless radial supporting of the innermost winding of the film roll; wherein the table has an upper side that includes a plurality of freely rotatable support rollers which are rotatable around axles that are oriented in a substantially radial direction with respect to the table for frictionless axial supporting of the film roll; wherein the annular support body of the winding drum is provided with a substantially radial slit for allowing the passage of the film drawn off from the innermost winding of the film roll; wherein separate driving means are provided for respectively rotating the sprocket for the film transport and the table; and including controllable coupling means for selectively coupling the winding drum with a stationary, non-rotatable support member or with the rotatable table, the latter case for the purpose of winding the film onto the winding drum for forming the film roll.

The details and advantages of the invention will appear more clearly in the following description and the accompanying drawings, given by way of example.

DETAILED DESCRIPTION OF THE PREFERRED EMBODIMENT

Figure 1:
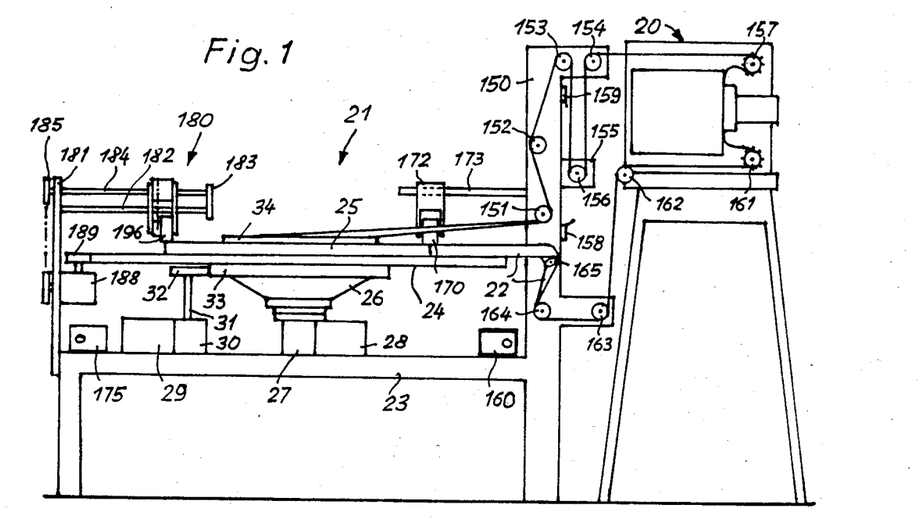
FIG. 1 is a schematic side elevation view of a cinematographic projector and an apparatus according to the invention for the endless projection of motion-picture films.

Referring to FIG. 1, there is shown a cinematographic projector 20 and an apparatus 21 which allows the endless projection of a motion-picture film 22 as hereafter disclosed in detail. The apparatus 21 comprises a stationary frame 23 carrying a horizontal circular table 24 for supporting a spiral-like film roll 25. The table is supported by an armature 26, which in turn is rotatably journalled on a gear box 27, as described later. The gear box 27 accomodates an angle gear connected to an electric drive motor 28. The latter, however, does not serve to rotate the table 24, but to drive a shaft coaxially journalled within the armature 26, as will be explained later. For rotating the table 24, a second drive motor 29 is mounted on the frame 23. By means of an angle gear housed in a second gear box 30, the motor 29 is coupled with a vertical shaft 31, the upper end of which carries a friction wheel 32 bearing against a cylindrical rim 33 of the armature 26. When the motor 29 is switched on, the frictional wheel 32 transmits its rotational movement to the armature 26 and the table 24. On the upper side of the table 24 a winding drum 34 is coaxially mounted, the winding drum serving to radially support the innermost winding of the film roll 25, as will be described below.

Figure 2:
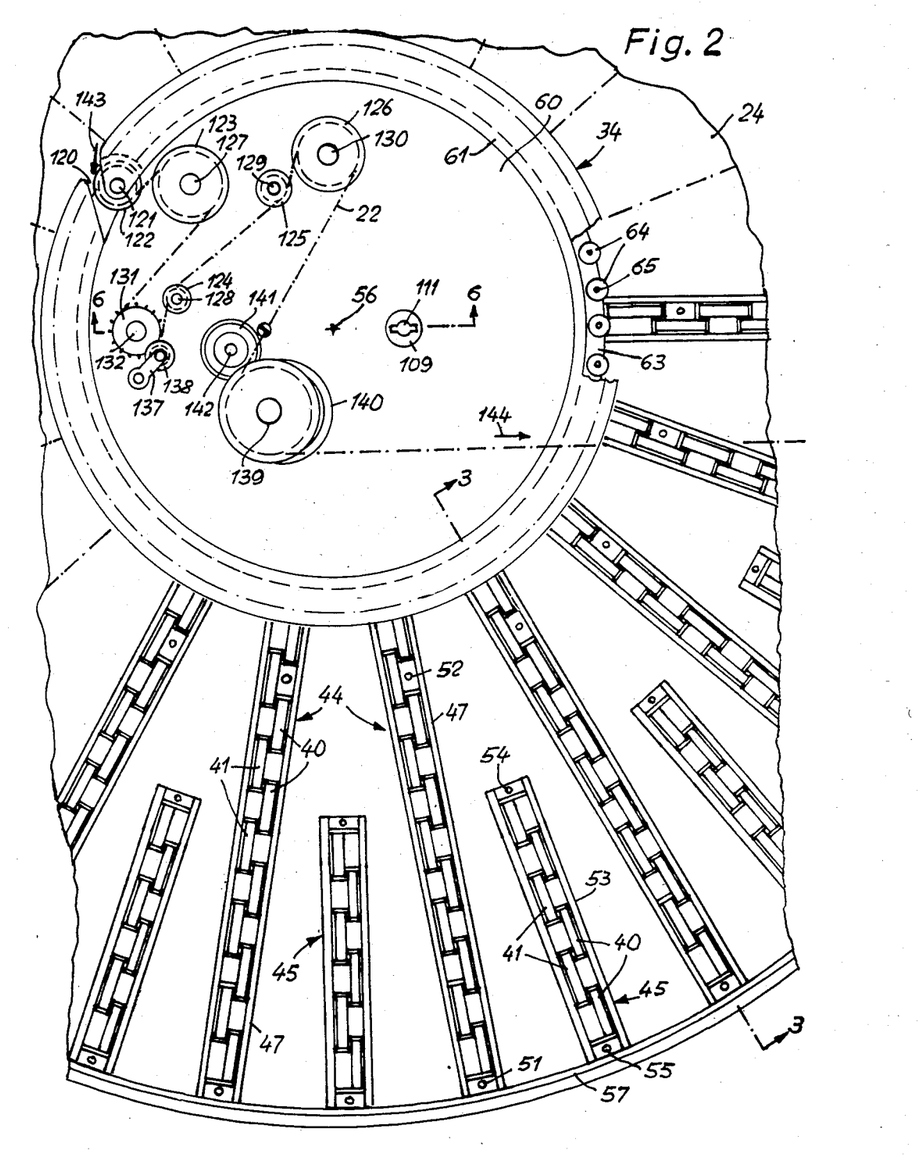
FIG. 2 is a top plan view, in a larger scale, of a portion of the apparatus according to the invention.
Figures 3, 4, 5, 7:
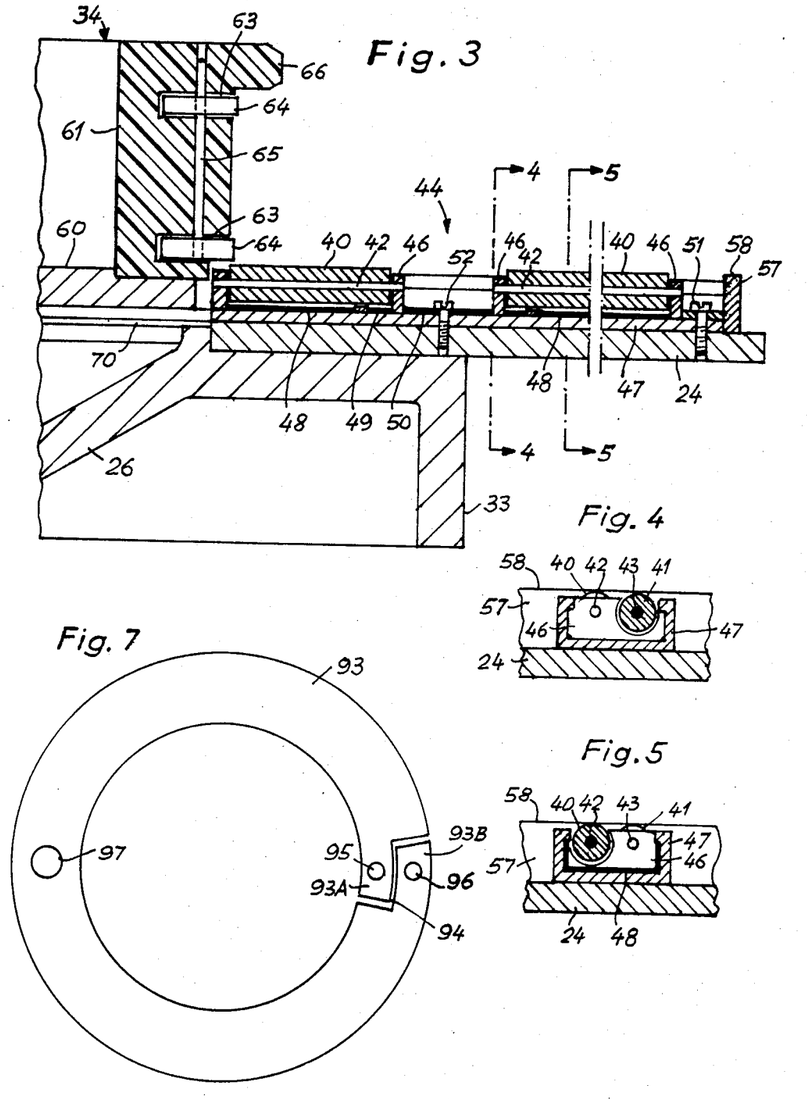
FIG. 3 is a sectional view taken along the line 3—3 in FIG. 2, in even larger scale.
FIG. 4 shows a cross-section taken along the line 4—4 in FIG. 3.
FIG. 5 shows a similar cross-section taken along the line 5—5 in FIG. 3.
FIG. 7 shows a top plan view of a coupling ring having variable diameter, which is a part of the portion of the apparatus shown in FIG. 6.

As shown in FIGS. 2 to 5, the top side of the table 24 is provided with a plurality of individually rotatable support rollers 40 and 41 for axially supporting the film roll 25 in a frictionless fashion. Each of the support rollers 40 and 41 has a cylindrical peripheral surface and is rotatably journalled on an axle 42 or 43, respectively (FIGS. 3 to 5). The support rollers 40 and 41 extend substantially in radial directions of the table 24, and the axial length of each support roller is a fraction only of the radial dimension of the table 24. As shown in FIG. 2, the support rollers 40 and 41 are arranged in larger groups 44 and smaller groups 45, all the support rollers forming such a group being arranged in two adjacent parallel arrays running in a radial direction of the table 24. The support rollers 40 forming one of the parallel arrays are offset with respect of the support rollers 41 forming the other array, in axial direction by a distance smaller than the axial dimension of an individual support roller 40 or 41, so that the end portions of neighboured support rollers 40 and 41 of one and the other array overlap, as clearly shown in FIG. 2. By this arrangement, the support rollers 40 of one array bridge the gaps between the support rollers 41 of the other array, and vice versa.

According to FIGS. 3 to 5, the ends of the axles 42 and 43, on which the support rollers 40 and 41, respectively, are freely rotatable, are fixed in bores of bearing jaws 46. The bearing jaws 46 belonging to a larger group of the support rollers are accomodated in a rail 47 of U-shaped cross-section, and spacers 48, 49 and 50, respectively, each having a U-shaped cross-section, are placed between the consecutive bearing jaws 46 within the rail 47. By means of the rail 47, the support rollers 40 and 41 forming the group 44 as well as the associated bearing jaws 46 and spacers 48, 49 and 50 are held together so as to form a structural unit which is mounted on the table 24 by means of bolts 51 and 52. Similarly, the support rollers 40 and 41 forming a smaller group 45 are arranged at a common rail 53 of U-shaped cross-section (FIG. 2) so as to form a structural unit mounted on the table 24 by means of bolts 54 and 55. According to FIG. 2, the larger groups 44 of support rollers 40 and 41 alternate with the smaller groups 45 in the circumferential direction of the table 24, and the ends of the rails 47 and 53 remote from the center 56 of the table have equal distances from the center. In the vicinity of the periphery of the table 24, an annular band 57 (FIGS. 2 and 3) runs around the rails 47 and 53 and is fixed to the outer ends thereof in a not shown manner. The annular band 57 has an upper surface 58 lying in an imaginary horizontal plane comprising also the uppermost generatrics of every support rollers 40 and 41.

Referring now to FIGS. 2 and 3, the winding drum 34 comprises a horizontal disk-shaped bottom 60 and an annular body 61 extending upwardly from the periphery of the bottom 60. The outer peripheral surface of the annular body 61 is provided with a pair of parallel circumferential grooves 63, in each of which a plurality of support rollers 64 are arranged. Pairs of support rollers 64 in the upper and in the lower circumferential groove 63 are rotatably journalled on common vertical axles 65, as can best seen in FIG. 3. The support rollers 64 extend beyond the outer peripheral surface of the annular body 61 and follow each other in circumferential direction of the annular body at sufficient small distances in order to prevent the innermost winding of the film roll 25 from contacting the annular body 61. Consequently, the innermost winding of the film roll 25 is radially supported by the rotatable support rollers 64 so that any friction between the winding drum 34 and the film roll 25 is eliminated. A radially protuding rim 66 at the upper end of the annular body 61 serves to hold down some inner windings of the film roll onto the adjacent horizontal support rollers 40 at the table 24.

Figure 6:
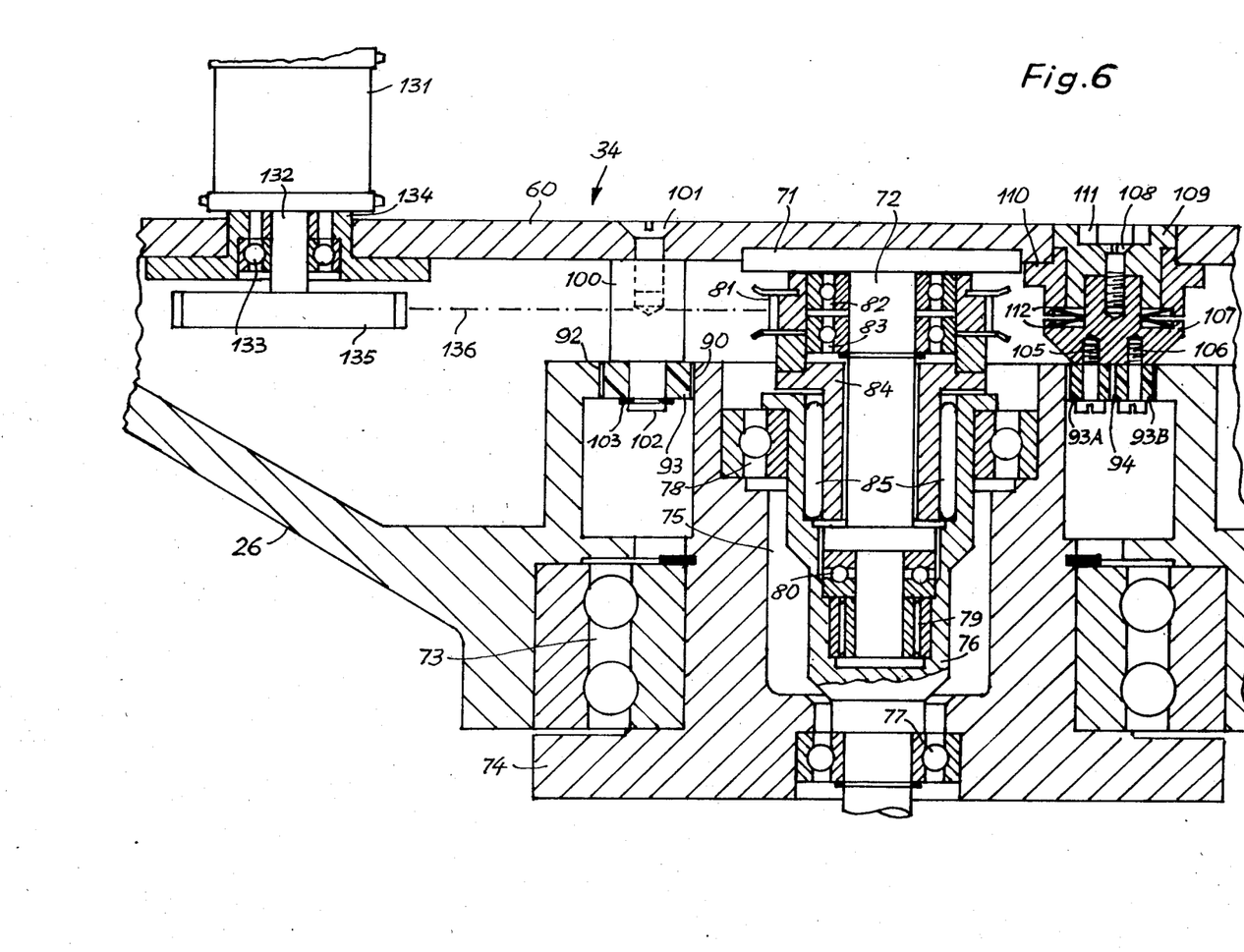
FIG. 6 is a sectional view taken along the line 6—6 in FIG. 2, in a larger scale.

The winding drum 34 is independent of the table 24 and is located above a central opening 70 (FIG. 3) of the table. While the table 24 is immediately supported on the armature 26, as shown in FIG. 3, the bottom 60 of the winding drum 34 is mounted on a horizontal flange 71 of a central shaft 72 extending coaxially through the armature 26, as shown in FIG. 6. The armature 26 in turn is rotatably journalled, by means of a double-row ball bearing 73, on a stationary support 74, the latter being mounted on the gear box 27 (FIG. 1). The support 74 is provided with a central recess 75, in which a partially hollow shaft 76 is rotatably mounted by means of a pair of ball-bearings 77 and 78. The lower end of the shaft 76 is operatively coupled with the drive motor (FIG. 1), via the angle gear in the gear box 27. The before-mentioned shaft 72, which supports the winding drum 34, extends coaxially into the hollow shaft 76, the lower end portion of the shaft 72 being supported on the shaft 76 by means of a needle-bearing 79 and a trust-bearing 80. Immediately below the flange 71, a toothed wheel 81 is rotatably journalled on the shaft 72 by means of a pair of ball-bearings 82 and 83. The toothed wheel 81 is fixedly connected to a bush 84 which surrounds the shaft 72 and extends into the hollow shaft 76. Between the outer circumferential surface of the bush 84 and the inner circumferential surface of the recess in the hollow shaft 76 there are a series of one-way clutch devices for coupling the shaft 76 with the bush 84 for rotation in one sense only. One-way clutch devices suitable for this purpose are generally known and available on the market, for example those manufactured by the Torrington Company, so that there is no need for a detailed description thereof.

A special coupling ring 93, as illustrated in FIGS. 6 and 7, is arranged between an outer circumferential surface 90 of the support 74 and an inner circumferential surface 91 of the armature 26. At one location along its periphery, the coupling ring 93 is provided with a throughgoing slit 94, the shape of which is so that two overlapping end portions 93A and 93B are formed. Each one of the end portions has a bore 95 or 96, respectively. A further bore 97 is made in the coupling ring 93 at a location diametrically opposite to the slit 94. As shown in FIG. 6, a support pin 100 is fixed by means of a bolt 101 at the lower side of the bottom 60 of the winding drum 34. A portion 102 of the support pin 100 engages the bore 97 of the coupling ring 93, and a radially elastic securing ring 103 holds the coupling ring in position on the support pin 100. A pair of bolts 105 and 106, each of which has a cylindrical portion extending into the bore 95 or 96, respectively, of the coupling ring 93, are fixed at a common rotary member 107. The latter is connected, by means of a bolt 108, to a rotary cylinder 109, which in turn is rotatably journalled in a bush 110 attached to the lower side of the bottom 60 of the winding drum 34. The upper axial end portion of the rotary cylinder 109 extends through a suitable opening in the bottom 60 and is provided with a freely accessible recess 111 of non-circular shape (see also FIG. 2). The recess 111 is intended to receive a key (not shown) for turning the rotary cylinder 109 and rotary member 107 in the bush 110 in order to increase or decrease the diameter of the coupling ring 93. When the diameter of the coupling ring 93 is increased, the outer circumferential surface thereof is pressed against the inner circumferential surface 92 of the armature 26, whereby the winding drum 34 is coupled with the armature 26 and the table 24. When, on the other hand, the diameter of the coupling ring 93 is decreased, the inner circumferential surface thereof is pressed against the outer circumferential surface 90 of the stationary support 74, whereby the winding drum 34 is blocked against rotation. Between the rotary member 107 and the bush 110 there are inserted some Belleville-type plate springs 112 which are capable of maintaining by friction the structural unit consisting of the rotary member 107 and the rotary cylinder 109 in its actual angular position with respect to the bush 110, so that the mentioned coupling of the winding drum 34 with either the armature 26 or the support 74 is preserved.

According to FIG. 2, the annual body 61 of the winding drum 34 is provided at a location along its periphery with a substantially radial slit 120, through which the innermost winding of the film roll 25 can be fed into the inner space of the winding drum 34. Adjacent to the slit 120 there is mounted a guide pulley 122 having a vertical axle 121 for the film strip portion entering into the winding drum 34. A plurality of further guide pulleys 123 to 126 for the film strip 22 are mounted for free rotation on associated vertical axles 127 to 130 within the winding drums 34, these axles being fixed to the bottom 60 of the winding drum. Additionally, a sprocket 131 for the feed motion of the film strip 22 is seated on a vertical shaft 132. As illustrated in FIG. 6, the shaft 132 is rotatably journalled by means of ball-bearings 133 in a bearing bush 134 fixed to the bottom 60 of the winding drum 34, only one of the ball-bearings 133 being visible in FIG. 6. The lower end of the shaft 132 carries a toothed wheel 135 which is operatively coupled with the before-mentioned toothed wheel 81 by means of a toothed belt 136 running below the bottom 60 of the winding drum 34, as schematically indicated in FIG. 6. Associated with the sprocket 131 is a pressure roller 138 (FIG. 2) which is rotatably mounted on a rocker arm 137. Finally, a further guide pulley 140 rotatable on an inclined axle 139 as well as an associated truncated guide pulley 141 having a vertical axle 142 are also arranged within the winding drum 34. The two last-mentioned pulleys 140 and 141 enable the film strip 22 to be drawn off without any folding over the upper rim of the annular body 61 of the winding drum 34 in a direction substantially radial to the table 24. The path of the film strip 22 over the various guide pulleys arranged in the inner space of the winding drum 34 is illustrated in FIG. 2 by dotted lines and arrows 143 and 144.

FIG. 1 shows how the film strip 22 is fed from the winding drum 34 to the projector 20. Some guide pulleys 151 to 154 having horizontal axes are rotatably mounted on an upstanding extension 150 of the frame 23. A carriage or sled 155 is movable in vertical directions along the extension 150. A further guide pulley 156 having a horizontal axis is rotatably mounted on the carriage or sled 155. Under the action of the gravity or a spring (not shown) the carriage or sled 155 has the tendency to move downward, whereby the portion of the film strip 22 running between the sprocket 131 in the winding drum 34 and an upper sprocket 157 of the projector 20 is tensioned by a given tension force. The upstanding extension 150 carries a pair of end switches 158 and 159 which are actuatable by the carriage or sled 155 when the latter reaches the upper or lower end of the allowed path of movement, respectively. The end switches 158 and 159 are connected to an electrical control device 160 for adjusting the speed of the motor 28 for driving the sprocket 131 in the winding drum 34.

Figure 10:
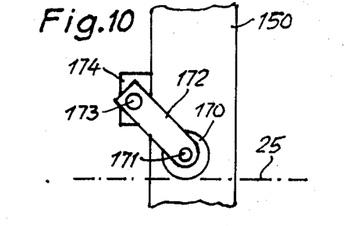
FIG. 10 illustrates a side elevation view of another portion of the apparatus according to FIG. 1, in a larger scale.

From the lower sprocket 161 and a guide pulley 162 of the projector 20 the film strip 22 runs over a series of further guide pulleys 163, 164 and 165 back to the table 24, where the film strip is wound up on the outer periphery of the film roll 25. For maintaining the windings of the film roll 25 in contact with the horizontal support rollers 40 and 41 on the table 24, a hold-down roller 170 (FIGS. 1 and 10) is provided at the location where the film strip 22 coming back from the projector 20 tangentially meets the outer winding of the film roll 25. The hold-down roller 170 is rotatably journalled on an axle 171 which is oriented about radially to the table 24 and mounted on a rocker arm 172. The latter is pivotally mounted at a horizontal crossrail 173, which in turn is fixed at the upstanding extension 150 of the frame 23 by means of a support 174 (FIG. 10). The rocker arm 172 can be moved along the crossrail 173 in order to adjust the position of the hold-down roller 170 with respect to the diameter of the film roll 25.

The second motor 29 which serves to drive the armature 26 and the table 24 is connected to another electrical control device 175 for adjusting the speed of the motor 29. For the projection of a film the speed of the motor 29 is advantageously adjusted in such a manner that the angular speed of the table 24 is within a range limited by the angular speeds of the outermost and the innermost windings of the film roll 25.

Figure 8:
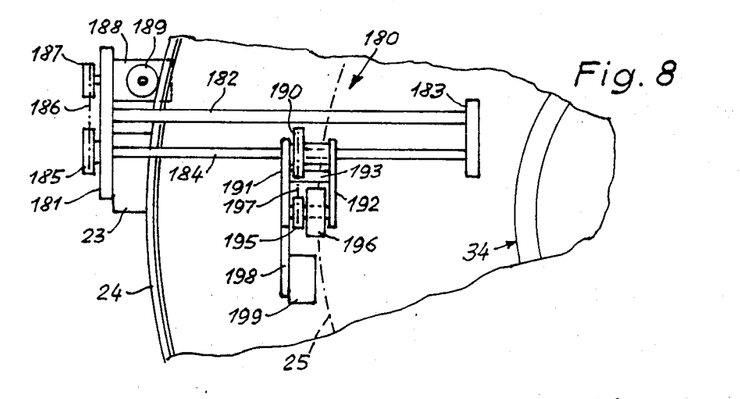
FIG. 8 is a top plan view of a portion of the apparatus according FIG. 1, in a larger scale.
Figure 9:
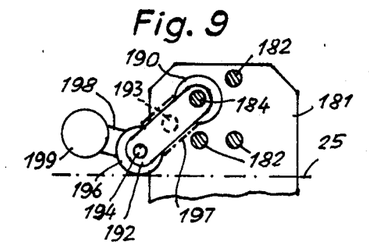
FIG. 9 is a cross-section taken along the line 9—9 in FIG. 8.

At a place substantially diametrically opposite to the holddown roller 170, there is provided a device 180 (FIGS. 1, 8 and 9) for controlling the compactness of the film roll 25. This device 180 comprises a carrying plate 181 rigidly mounted on the frame 23. A cantilever arm consisting of three parallel rods 182 and an end plate 183 is fixed to the carrying plate 181 so as to extend about radially to the table 24 from the outer periphery thereof toward the winding drum 34. Parallel to the rods 182 is arranged a shaft 184 which is rotatably journalled in the plates 181 and 183. The end portion of the shaft 184 remote from the winding drum 34 carries a toothed wheel 185 which, by means of a toothed belt 186, is coupled with a further toothed wheel 187. Via an angle gear housed in a gear box 188, the toothed wheel 187 is operatively coupled with a friction wheel 189 lying against the outer periphery of the table 24 so as to be rotated when the table 24 is turned. The shaft 184 passes through a toothed wheel 190 which is displaceable along the shaft 184 while constantly being coupled therewith for rotation. The toothed wheel 190 is located between a pair of straps 191 and 192 pivotally and displaceably mounted on the shaft 184 and interconnected by a stud 193. On the straps 191 and 192 there is mounted an axle 194 parallel to the shaft 184. A further toothed wheel 195 as well as a friction wheel 196 coupled therewith are rotatably journalled on the axle 194. By means of a toothed belt 197 the two wheels 190 and 195 are operatively coupled. One, 191, of the pair of straps comprises an extension 198 slightly bent upward and provided with a weight 199, so that under the influence of the gravity the straps 191 and 192 have the tendency to pivot downward. For the projection of a film 22, the structural unit consisting of the elements 190 to 199 is adjusted along the shaft 184 in such a manner that the friction wheel 196 is lying on some outermost windings of the film roll 25.

The mode of operation of the described and illustrated apparatus for the endless projection of a film is substantially as follows:

First of all, the film roll 25 must be build up on the table 24. To this end, when the table 24 is not rotating, the winding drum 34 is firmly coupled with the armature 26 by means of the coupling ring 93 (FIG. 6). For doing this, the rotary cylinder 109 and the rotary member 107 fixed thereto are turned counterclockwise by means of a key (not shown) introduced into the recess 111 of the cylinder 109, thus causing a spreading of the coupling ring 93 and an increase of its diameter. Thereafter, the leading end of the film 22 is put through the slit 120 of the annular ring 61 of the winding drum 34, as indicated by an arrow 143 in FIG. 2, and then provisionally fastened in any suitable manner in the inner space of the winding drum 34. After that, the drive motor 29 is switched on so that the table 24 and the winding drum 34 together begin to rotate in a clockwise direction in FIG. 2. Thereby the film 22 is spiral-like wound around the annular body 61 of the winding drum 34 and the film roll 25 is built up.

For the endless projection of the film 22, the winding drum 34 must be uncoupled from the armature 26 and firmly coupled with the stationary support 74. To this end, the rotary cylinder 109 and the rotary member 107 are turned clockwise by means of the before-mentioned key, thus causing a decrease of the diamter of the coupling ring 93. The leading end portion of the film 22 is then laid around the guide pulleys 122 and 123, around the sprocket 131 and around the various guide pulleys 124, 125, 126 and 140 as indicated by dotted lines in FIG. 2. When doing so, it is possible to draw the film strip 22 off from the innermost winding of the film roll 25, as shown by arrows 143 and 144, when the table 24 is simultaneously rotated counterclockwise. The sprocket 131 can then rotate freely, because the one-way clutch 85 (FIG. 6) is inoperative for the direction of rotation so that there is no coupling with the shaft 76. The leading end portion of the film 22 is then laid around the further guide pulleys 151, 152, 156 and 154 and loaded into the projector 20 in usual manner. Finally, the leading end portion of the film 22 is drawn around the guide pulleys 162 to 165 back to the film roll 25, and then spliced with the trailing end of the film.

In order to project the film 22, the projector 20 and the two drive motors 28 and 29 are simultaneously switched on. The motor 28 drives the shaft 76 (FIG. 6) and via the now operative one-way clutch 85 the bush 84 and the toothed wheel 81 connected thereto. By means of the toothed belt 136 the toothed wheel 135 and the shaft 132 as well as the sprocket 131 are also driven anti-clockwise in FIG. 2. The rotating sprocket 131 moves the film strip through the slit 120 in the annular body 61 of the winding drum 34, whereby the film is continously drawn off from the film roll 25. By means of the electrical control device 160 and, if necessary also the end switches 158 and 159, the speed of the motor 28 is automatically adjusted so that the film feed caused by the sprocket 131 is equal to the film speed through the projecctor 20. When the film 22 is drawn off from the film roll 25 in the described manner, the innermost winding of the film roll runs frictionless over the support rollers 64 at the annular body 61, so that the occurence of scratches and scrapes in the emulsion of the film due to friction is practically precluded. Together with the innermost winding also the other windings of the film roll 25 move around the winding drum 34, in counterclockwise direction in FIG. 2. This rotation of the whole film roll 25 is favored by the rotation of the table 24 in the same sense. Thus, excessive tensional stress in the film strip is avoided.

The running speed of the film is all the same in every winding of the film roll 25. However, because the diameter of the windings increases from the innermost to the outermost windings, the angular speed of the windings is not the same, but decreases from the innermost to the outermost windings. Advantageously, the speed of the drive motor 29 is set to a value, by means of the control device 175, so that the angular speed of the table 24 is substantially equal to the arithmetic mean value of the angular speeds of the innermost and the outermost windings of the film roll 25. By doing so, the smallest possible differencies between the running speeds of the individual windings of the film roll and the portions of the table 24 lying vertically below the windings are obtained. As the film roll 25 is supported on the table 24 by means of the rotatable support rollers 40 and 41, no windings of the film roll have to slide on the table 24, and only very minor rolling frictions do occur. Because the axial length of each support roller 40 or 41 is short in comparison with the radial dial dimension of the film roll 25, the windings of the film roll lying on one and the same support roller do not have significantly different angular speeds. Thus, also the friction between the windings and the support rollers are very low. With the described structural conception and arrangement of the support rollers 40 and 41 as well as of the driving means for the table 24 it is ensured that the whole film 22 can run through the film roll 25 without any danger of damage, and that the tension force applied to the film by means of the sprocket 131 for moving the film in the described manner is relatively low.

The hold-down roller 170 lying on some outer windings of the film roll 25 under the influence of the gravity ensures that the film portion continuously running back from the projector 20 is brought into contact with the support rollers 40 and 41 of the table 24, so that the edges of the film in the various windings of the film roll 25 are maintained in alignement.

When the table 24 is rotated by means of the friction wheel 189, the gear in the gear box 188, the toothed wheels 187 and 185 and the toothed belt 186, simultaneously also the shaft 184 of the device 180 is driven. The rotation of the shaft 184 is transmitted via the toothed wheel 190, the toothed belt 197 and the toothed wheel 195 to the friction wheel 196. Under the influence of the gravity, the friction wheel 196 is lying on a few outermost windings of the film roll 25. The peripheral speed imparted to the friction wheel 196 is a little bit lower than the running speed of the outermost winding of the film roll. Consequently, the friction wheel 196 excerts a given braking action on the outermost winding of the film roll 25, with the effect that all the windings of the film roll are permanently in contact one with another by a certain minor pressure. Thus, the occurence of a partly too loose film roll, in which possibly unnecessary great differencies in the angular speed of consecutive or neighboured windings could be noted, is effectively precluded.

Summarizing, it is to be noted that during the endless projection of the film 22, the film roll 25 surrounding the winding drum 34 and axially supported by the table 24 is continuously reduced at its inner periphery and simultaneously continuously built up at its outer periphery, while the inner and outer diameters remain constant.

For preparing the film roll 25 before beginning the projection of the film and for drawing off the film from the film roll after termination of the endless projection, the hold-down roller 170 and the friction wheel 196 can be swung upward in inoperative positions, in which they do no longer contact the film roll 25.

I claim:

1. An apparatus for the endless projection of a cinematogprahic film, said apparatus comprising a rotatably journalled table for axially supporting a spiral-like film roll, a winding drum coaxially arranged on said table and having an annular support body for radially supporting an innermost winding of said film roll and for defining an interior space in said winding drum, first guide pulleys for continuously delivering the film from the innermost winding of the film roll for the purpose of feeding the film to a film projector, at least some of said first guide pulleys being located with said space of said winding drum, further guide pulleys for guiding the film coming back from the projector to an outermost winding of the film roll, a sprocket for the film transport located within said interior space of the winding drum; wherein said annular support body of said winding drum has an outer circumference mounting a plurality of pairs of support rollers which are freely rotatable on axles extending in parallel with an axis of the winding drum for frictionless radial supporting of the innermost winding of the film roll; wherein said table has an upper side that includes a plurality of freely rotatable support rollers which are rotatable around axles that are oriented in a substantially radial direction with respect to the table for frictionless axial supporting of the film roll; wherein the annular support body of the winding drum is provided with a substantially radial slit for allowing the passage of the film drawn off from the innermost winding of the film roll; wherein separate driving means are provided for respectively rotating the sprocket for the film transport and the table; and including controllable coupling means for selectively coupling the winding drum with a stationary, non-rotatable support member or with the rotatable table, the latter case for the purpose of winding the film onto the winding drum for forming the film roll.

2. The apparatus according to claim 2, wherein said support rollers on said table each have an axial length which is a fraction only of the radial dimension of said table, and wherein said support rollers on said table are arranged in groups comprising at least two parallel arrays of said support rollers, the support rollers of one of said arrays being offset in radial direction of the table with respect to the support rollers of the other array of the same group, so that gaps between the axial ends of consecutive support rollers of one array are bridged by the support rollers of the other array, and vice versa, and wherein the support rollers forming an array are axially aligned, each of said support rollers being rotatably journalled on an individual jaws, and wherein all the support rollers forming a group, as well as the thereto associated axles and bearing jaws, are arranged in the inner space of a common rail of U-shaped cross-section, said rail being mounted at the upper side of the table in substantially radial direction thereof.

3. The apparatus according to claim 1, wherein said coupling means comprise a coupling ring having a variable diameter and being arranged between a cylindrical outer surface of said stationary support member and a cylindrical inner surface of an armature firmly connected to the table, said coupling ring being fixed to the winding drum and having a slit so as to form two overlapping end portions of the coupling ring, said end portions being connected to a force transmitting member which is actuatable in such a manner that the diameter of the coupling ring is selectively increased or decreased for clamping the coupling ring either on the stationary support member or on the armature of the table.

4. The apparatus according to claim 3, wherein said force transmitting member is turnably mounted at a bottom of the winding drum so as to have a freely accessible end which is shaped to receive a hand-tool for turning the force transmitting member when the position of the coupling ring is to be changed.

5. The apparatus according to claim 1, wherein the upper side of the table is provided with an annular band running along the outer periphery of the table, the top surface of said annular band lying in a plane containing also the uppermost generatrics of every support roller on the table.

6. The apparatus according to claim 1, wherein a stationary crossrail is provided which extends over at least a portion of the table, said crossrail supporting a swingable arm pivotable about an axis parallel to the upper side of the table and carrying a rotatably journalled hold-down roller, and axis of which is substantially radial and parallel to the upper side of the table, said hold-down roller being subjected to the influence of gravity or a spring means and located so as to be able to lie on the outermost winding of the film roll for the purpose of holding said winding in contact with the support rollers of the table, said swingable arm being displaceable along said crossrail.

7. The apparatus according to claim 1, wherein a stationary cantilever is provided which extends over a portion of the table, said cantilever supporting a swingable arm pivotable about an axis parallel and radial to the upper side of the table and carrying a rotatable friction roller, the axis of which is parallel and radial to the upper side of the table, said friction roller being subjected to the influence of gravity or a spring means and located so as to be able to lie on the outermost winding of the film roll for the purpose of braking said winding by a friction action, said swingable arm being displaceable along said cantilever.

8. The apparatus according to claim 7, wherein said friction roller is operatively coupled by torque transmitting means with the table so as to be drivable by the rotation of the table, the rotational speed at the periphery of the friction roller being slightly less than the rotational speed of the portion of the table directly below the friction roller.

9. The apparatus according to claim 8, wherein said torque transmitting means comprise a friction wheel in frictional engagement with the outer periphery of the table, a shaft extending in a direction parallel to said cantilever, and coupling means for operatively coupling said friction wheel with said shaft, a further wheel supported on said shaft and being displaceable along said shaft together with said swingable arm while permanently remaining coupled with said shaft for rotation, said further wheel being operatively coupled with said friction roller carried by said swingable arm.

* * * * *